United States Patent
Kato

(10) Patent No.: US 9,897,483 B2
(45) Date of Patent: Feb. 20, 2018

(54) PHOTOELECTRIC CONVERSION APPARATUS, FOCUS DETECTION APPARATUS, AND IMAGE CAPTURING SYSTEM

(71) Applicant: CANON KABUSHIKI KAISHA, Tokyo (JP)

(72) Inventor: Satoshi Kato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 269 days.

(21) Appl. No.: 14/954,554

(22) Filed: Nov. 30, 2015

(65) Prior Publication Data
US 2016/0156859 A1 Jun. 2, 2016

(30) Foreign Application Priority Data

Dec. 2, 2014 (JP) ................. 2014-244335

(51) Int. Cl.
| | |
|---|---|
| *G01J 1/44* | (2006.01) |
| *G02B 7/34* | (2006.01) |
| *H04N 5/378* | (2011.01) |
| *H04N 5/232* | (2006.01) |

(52) U.S. Cl.
CPC .............. *G01J 1/44* (2013.01); *G02B 7/34* (2013.01); *H04N 5/378* (2013.01); *G01J 2001/4413* (2013.01); *H04N 5/23212* (2013.01)

(58) Field of Classification Search
CPC ...... G01J 1/44; G01J 2001/4413; G02B 7/34; H04N 5/23212; H04N 5/378
See application file for complete search history.

(56) References Cited

U.S. PATENT DOCUMENTS

2008/0246544 A1\* 10/2008 Fujino ................ H03F 3/45183
 330/278
2012/0188428 A1 7/2012 Tanaka

FOREIGN PATENT DOCUMENTS

| CN | 101123671 A | 2/2008 |
|---|---|---|
| CN | 101510963 A | 8/2009 |
| CN | 102143317 A | 8/2011 |
| CN | 102158657 A | 8/2011 |
| CN | 102164252 A | 8/2011 |
| JP | 2011130135 A | 6/2011 |

\* cited by examiner

*Primary Examiner* — Francis M Legasse, Jr.
(74) *Attorney, Agent, or Firm* — Canon USA, Inc., IP Division

(57) ABSTRACT

A photoelectric conversion apparatus includes a photoelectric conversion unit, a signal line, a circuit block, and a control circuit. The circuit block includes a differential amplifier circuit including a feedback path, a first switch that controls conduction between an output terminal and the signal line, a second switch that controls conduction between an inverting input terminal and the signal line, and a third switch that controls conduction between the inverting input terminal and the output terminal. The control circuit controls a signal for controlling the first switch and a signal for controlling the third switch to have the relation of logical NOT.

20 Claims, 12 Drawing Sheets

PHOTOELECTRIC CONVERSION APPARATUS, FOCUS DETECTION APPARATUS, AND IMAGE CAPTURING SYSTEM

BACKGROUND OF THE INVENTION

1. Field of the Invention

The present invention relates to a photoelectric conversion apparatus, a focus detection apparatus, and an image capturing system.

2. Description of the Related Art

Japanese Patent Laid-Open No. 2011-130135 discloses a configuration of an autofocus (hereinafter referred to as AF) sensor in which a switch for connection to a common output line is disposed in a feedback path of a differential amplifier. This configuration can reduce the influence of voltage fluctuation due to switch resistance and enhance the accuracy of detection of the largest value and the smallest value of AF signals.

The method of driving disclosed in Japanese Patent Laid-Open No. 2011-130135 produces a period in which no feedback path is formed, so that a negative input terminal of an operational amplifier of the differential amplifier comes to a floating state, and the output signal changes toward a power source voltage or a ground potential.

Such a period can produce the following situations. A first situation is that the response time, that is, a signal read rate, decreases because it takes much time for the potential to converge to a predetermined value if signal reading is started in the state in which the output signal is at a power source voltage or a ground potential. A second situation problem is that the potential of the negative input terminal can change out of the input operation range of the operational amplifier due to crosstalk from a peripheral circuit. This can also reduce the response speed because it takes a much time for the potential of the negative input terminal to reach the predetermined value.

SUMMARY OF THE INVENTION

The present invention provides a photoelectric conversion apparatus including a photoelectric conversion unit, a signal line, a circuit block coupled between the photoelectric conversion unit and the signal line, and a control circuit configured to control the circuit block. The circuit block includes a differential amplifier circuit, a first switch, a second switch, and a third switch. The differential amplifier circuit includes a noninverting input terminal to which a signal from the photoelectric conversion unit is input, an inverting input terminal, an output terminal, and a feedback path coupling the inverting input terminal and the output terminal together. The first switch includes a first terminal coupling to the output terminal and a second terminal coupling to the signal line. The first switch is configured to control conduction between the output terminal and the signal line. The second switch includes a first terminal coupling to the inverting input terminal and a second terminal coupling to the signal line and the second terminal of the first switch. The second switch is configured to control conduction between the inverting input terminal and the signal line. The third switch includes a first terminal coupling to the inverting input terminal and a second terminal coupling to the output terminal and the first terminal of the first switch. The third switch is configured to control conduction between the inverting input terminal and the output terminal. The control circuit supplies a first signal for controlling the first switch and the second switch and a second signal for controlling the third switch. The first signal and the second signal are in relation of logical NOT.

Further features of the present invention will become apparent from the following description of exemplary embodiments with reference to the attached drawings.

DESCRIPTION OF THE EMBODIMENTS

First Embodiment

A first embodiment of the present invention will be described with reference to FIGS. 1 to 4. The first embodiment is an application to a phase-difference AF photoelectric conversion apparatus. In the following description, a switch includes at least a first terminal, a second terminal, and a control electrode that controls the connection between the first terminal and the second terminal. Examples of the switch include a metal-oxide-semiconductor (MOS) transistor and a complementary MOS (CMOS) switch. For example, if the switch is a MOS transistor, the first terminal of the switch is a first main electrode of the MOS transistor, and second terminal of the switch is a second main electrode of the MOS transistor. The first and second main electrodes of the MOS transistor are a source region and a drain region, and the control electrode is a gate. The term, terminal, includes not only an electrode but also a node. Coupling to a terminal includes not only coupling to an electrode but also coupling to the same node as that of the electrode.

Figure 1:
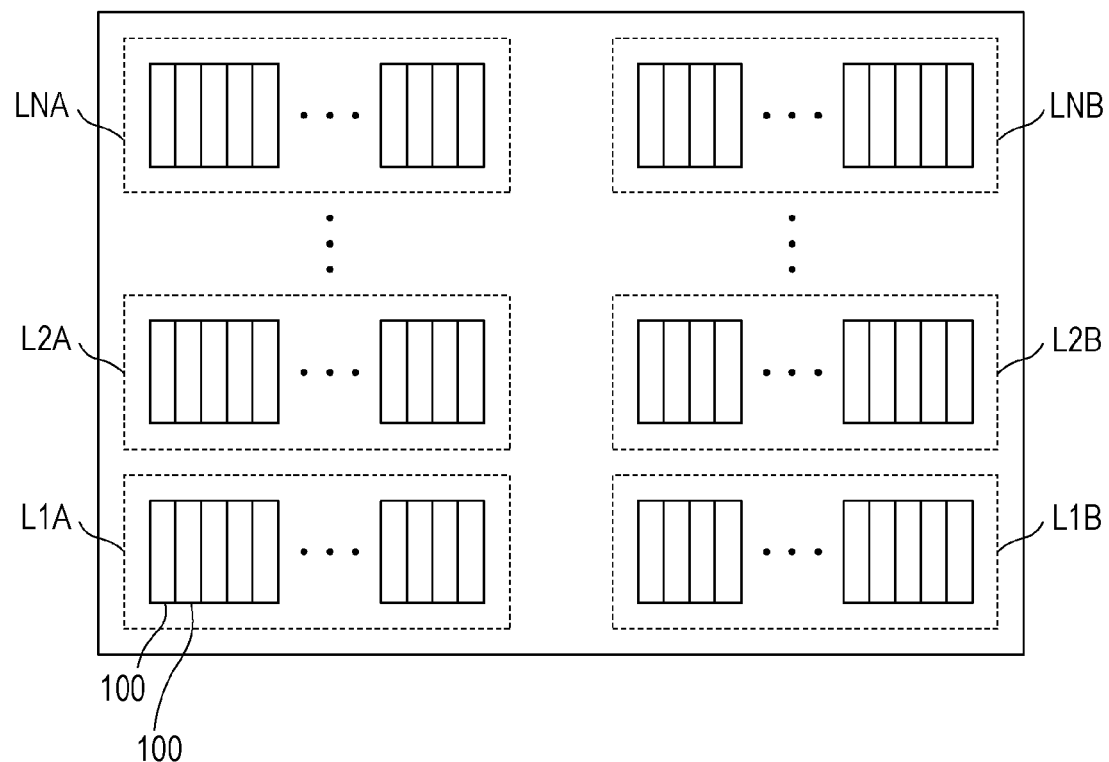
FIG. 1 is a schematic diagram for describing a photoelectric conversion apparatus according to a first embodiment of the present invention.

FIG. 1 is a schematic diagram of an imaging plane of a phase-difference AF photoelectric conversion apparatus. Line sensor unit pairs L1A and L1B, L2A and L2B, . . . , LNA and LNB are present on the imaging plane. The line sensor unit pairs are each used to measure the amount of defocusing of an object in one region of the imaging plane (the amount of deviation from an in-focus position). Disposing a plurality of line sensor unit pairs leads to providing a plurality of ranging points. This can improve the precision of AF. Each of the line sensor units includes a plurality of pixels 100. The photoelectric conversion apparatus includes a control circuit (not shown). Examples of the control circuit include a decoder and a timing generator. This control circuit supplies control signals for controlling the operations of the individual line sensor units.

Figure 2:
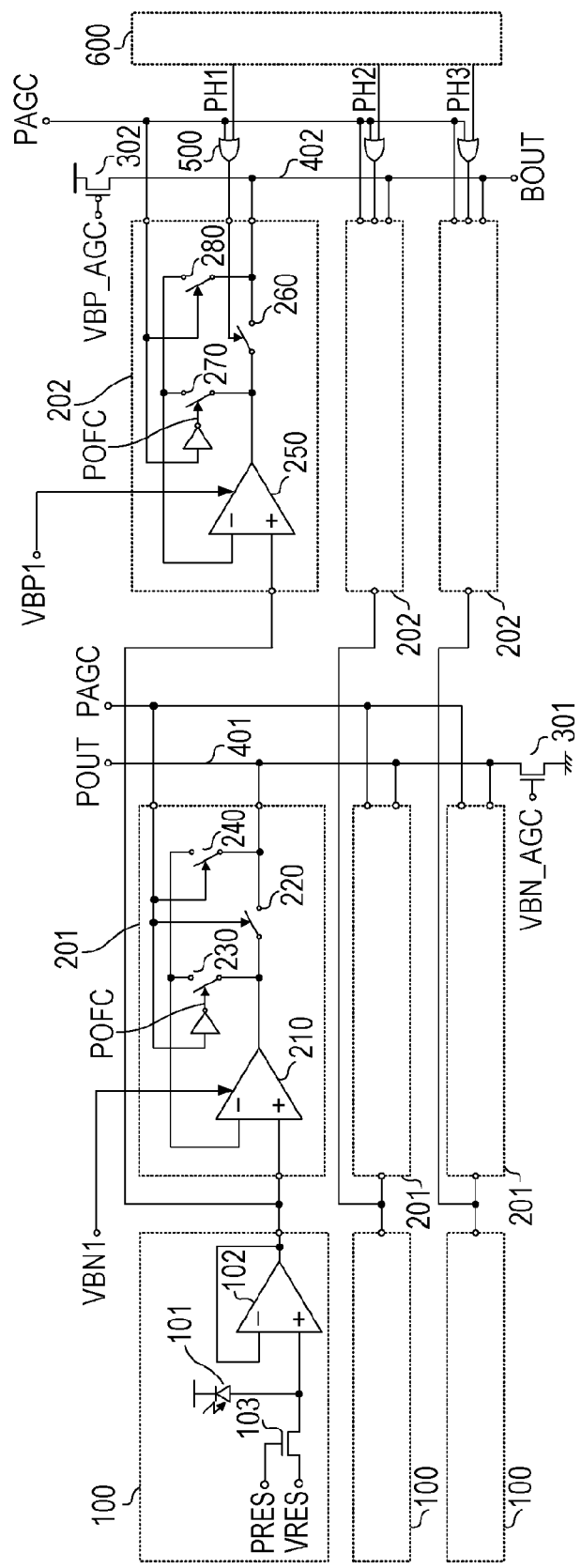
FIG. 2 is a circuit diagram for describing the photoelectric conversion apparatus according to the first embodiment.

FIG. 2 is a circuit diagram showing a detailed configuration example of one of the line sensor units in FIG. 1. For ease of explanation, an example in which the line sensor unit includes three pixels 100 will be described. The pixels 100 each include a photodiode (hereinafter referred to as PD) 101, which is a photoelectric conversion unit, an operational amplifier 102, which is a pixel amplifying unit, and a reset MOS transistor 103, which is a reset unit. The reset MOS transistor 103 resets the anode of the PD 101 and a noninverting input terminal of the operational amplifier 102. The cathode of the PD 101 is coupled to the node of a power source voltage (hereinafter referred to as VDD), and the anode is coupled to a first main electrode of the reset MOS transistor 103 and the noninverting input terminal of the operational amplifier 102. The operational amplifier 102 is configured as a voltage follower whose output terminal is coupled to the inverting input terminal. A signal from the pixel 100 is a signal output from the output terminal of the operational amplifier 102. A second main electrode of the reset MOS transistor 103 is coupled to the node of the reset voltage VRES.

The output terminal of the pixel 100 is coupled to a largest-value detection unit that detects a peak value (the largest value) of the signal and a smallest-value detection unit that detects a bottom value (the smallest value) of the signal. The largest-value detection unit includes a circuit block 201 and a current source 301. The smallest-value detection unit includes a circuit block 202 and a current source 302. An example of the current source 301 is a constant-current source, which includes an NMOS transistor and is coupled to a signal line 401. An example of the current source 302 is a constant-current source, which includes a PMOS transistor and is coupled to a signal line 402. The output nodes of the plurality of circuit blocks 201 are coupled in common to the signal line 401. The output nodes of the plurality of circuit blocks 202 are coupled in common to the signal line 402. In other words, the signal lines 401 and 402 are common output lines. The signal line 401 is coupled to an output POUT, and the signal line 402 is coupled to an output BOUT. Three sets of the pixel 100 and the circuit block 201 are coupled to the signal line 401. Three sets of the pixel 100 and the circuit block 202 are coupled to the signal line 402.

The circuit block 201 includes a differential amplifier circuit 210, a MOS transistor 220, a MOS transistor 230, and a MOS transistor 240. The MOS transistor 220 is a smallest-value output switch. The MOS transistor 230 is a feedback (hereinafter abbreviated as FB) control switch. The MOS transistor 240 is a second FB control switch. The second FB control switch is disposed to cancel the resistance of the smallest-value output switch. The FB control switch or the second FB control switch forms a feedback path (also referred to as a feedback loop).

The relation of connection among the devices of the connection circuit block 201 is as follows. A noninverting input terminal of the differential amplifier circuit 210 is coupled to the output terminal of the pixel 100. A signal from the photoelectric conversion unit is input to the noninverting input terminal of the differential amplifier circuit 210. An output terminal of the differential amplifier circuit 210 is coupled to a first main electrode of the MOS transistor 220 and a first main electrode of the MOS transistor 230. A second main electrode of the MOS transistor 220 is coupled to the signal line 401. A second main electrode of the MOS transistor 230 is coupled to the inverting input terminal of the differential amplifier circuit 210. A first main electrode of the MOS transistor 240 is coupled to the second main electrode of the MOS transistor 220 and the signal line 401. A second main electrode of the MOS transistor 240 is coupled to the second main electrode of the MOS transistor 230 and the inverting input terminal of the differential amplifier circuit 210. The coupling described above is coupling in which at least two of input and output terminals and main electrodes are coupled to the same node. The coupling further includes coupling in which parasitic resistance or parasitic capacitance is present between at least two of the input and output terminals and the main electrodes. The coupling further includes coupling in which another switch is disposed between at least two of the input and output terminals and the main electrodes. This is because if the operation of the switch is synchronization with the operation of a device having the input and output terminals or the main electrodes, then at least two of the input and output terminals and the main electrodes are regarded as being substantially coupled to the same node. This also applies to the following description.

The MOS transistor 220 is switched between a conducting state (ON) and a non-conducting state (OFF) in response to a signal PAGC supplied to its control electrode. The MOS transistor 230 is switched between a conducting state and a non-conducting state in response to a signal POFC, which is an inverted signal of the signal PAGC. The MOS transistor 240 is switched between a conducting state and a non-conducting state in response to the signal PAGC supplied to its control electrode. In the circuit block 202, the signal POFC is generated from the signal PAGC by an inverter circuit.

The circuit block 202 includes a differential amplifier circuit 250, a MOS transistor 260, a MOS transistor 270, and a MOS transistor 280. The MOS transistor 260 is a smallest-value output switch. The MOS transistor 270 is an FB control switch. The MOS transistor 280 is a second FB control switch. The second FB control switch is disposed to cancel the resistance of the smallest-value output switch. Like the circuit block 201, the FB control switch or the second FB control switch forms a feedback path.

The relation of connection among the devices of the circuit block 202 is as follows. A noninverting input terminal of the differential amplifier circuit 250 is coupled to the output terminal of the pixel 100. A signal from the photoelectric conversion unit is input to the noninverting input terminal of the differential amplifier circuit 250. An output terminal of the differential amplifier circuit 250 is coupled to a first main electrode of the MOS transistor 260 and a first main electrode of the MOS transistor 270. A second main electrode of the MOS transistor 260 is coupled to the signal line 402. A second main electrode of the MOS transistor 270 is coupled to the inverting input terminal of the differential amplifier circuit 250. A first main electrode of the MOS transistor 280 is coupled to the second main electrode of the MOS transistor 260 and the signal line 402. A second main electrode of the MOS transistor 280 is coupled to the second main electrode of the MOS transistor 270 and the inverting input terminal of the differential amplifier circuit 250.

The MOS transistor 260 is switched between a conducting state and a non-conducting state in response to the output of an OR gate 500. When one of a signal PAGC and signals PH1, PH2, . . . supplied from a scanning circuit 600 is at high level, the MOS transistor 260 is brought into conduction. The MOS transistor 270 is switched between a conducting state and a non-conducting state in response to a signal POFC, which is an inverted signal of the signal PAGC. The MOS transistor 280 is switched between a conducting state and a non-conducting state in response to the signal PAGC. The signal POFC is generated from the signal PAGC by an inverter circuit also in the circuit block 202.

Assuming that the circuit block 202 is a first circuit block, the MOS transistor 260 is a first switch, the MOS transistor 280 is a second switch, and the MOS transistor 270 is a third switch. Assuming that the circuit block 201 is a second circuit block, the MOS transistor 220 is a fourth switch, the MOS transistor 240 is a fifth switch, and the MOS transistor 230 is a sixth switch.

Figure 3A:
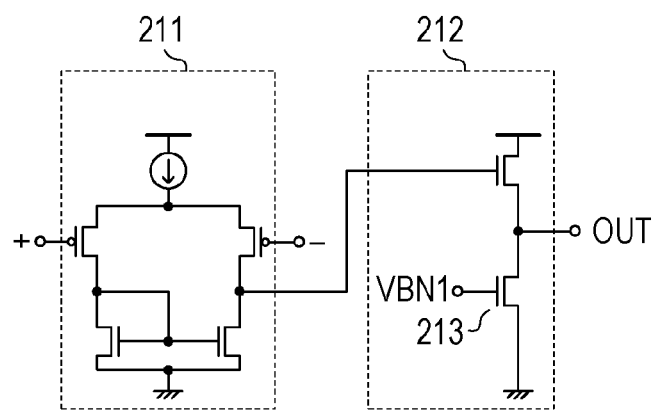
FIG. 3A is a circuit diagram for describing a largest-value detection unit of the photoelectric conversion apparatus according to the first embodiment.

FIG. 3A is a circuit diagram showing a more detailed configuration example of the differential amplifier circuit 210. The differential amplifier circuit 210 can be divided into a differential input stage 211 and an output stage 212 formed of an NMOS source follower circuit. The differential input stage 211 includes two PMOS transistors, two NMOS transistors, and a current source. The two PMOS transistors respectively function as a noninverting input terminal and an inverting input terminal. A MOS transistor 213, which is a current source of the NMOS source follower circuit of the output stage 212, can control the current value in response to a signal VBN1 supplied to its control electrode and controls the operation of the output stage 212. The signal VBN1 is also referred to as bias voltage.

Figure 3B:
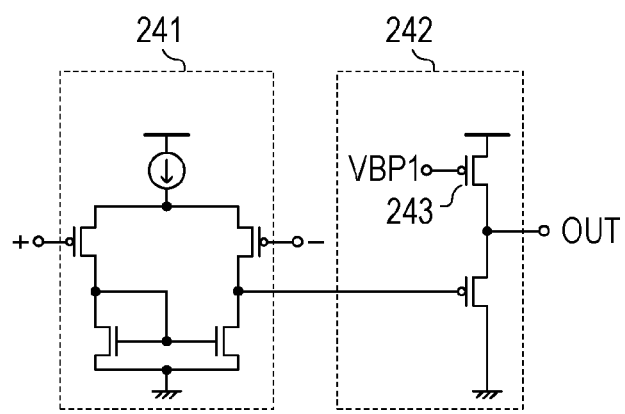
FIG. 3B is a circuit diagram for describing a smallest-value detection unit of the photoelectric conversion apparatus according to the first embodiment.

FIG. 3B is a circuit diagram showing a more detailed configuration of the differential amplifier circuit 250. The differential amplifier circuit 250 can be divided into a differential input stage 241 and an output stage 242 formed of a PMOS source follower circuit. The differential input stage 241 includes two PMOS transistors, two NMOS transistors, and a current source. The two PMOS transistors respectively function as a noninverting input terminal and an inverting input terminal. A MOS transistor 243, which is a current source of the PMOS source follower circuit of the output stage 242, can control the current value in response to a signal VBP1 supplied to its control electrode and can control the operation of the output stage 242. The signal VBP1 is also referred to as bias voltage.

Next, the operation of the photoelectric conversion apparatus according to this embodiment will be described with reference to the timing chart shown in FIG. 4. The signals shown in FIG. 4 correspond to the signals in FIG. 2 and FIGS. 3A and 3B. When the signals are at high level (hereinafter referred to as H level), corresponding MOS transistors go to a conducting state, and at low level (hereinafter referred to as L level), corresponding MOS transistors go to a non-conducting state.

Figure 4:
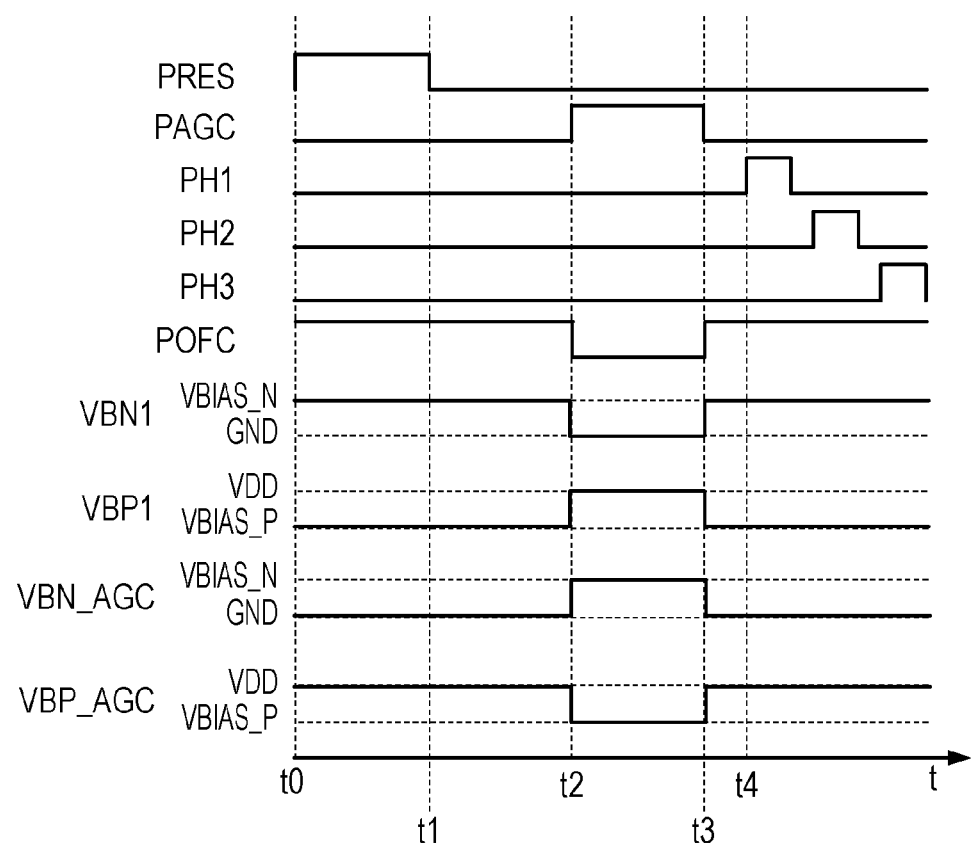
FIG. 4 is a timing chart for describing a method for driving the photoelectric conversion apparatus according to the first embodiment.

In FIG. 4, the period from time t0 to time t1 is a reset period, the period from time t1 to time t2 is a transmission preparation period for preparing for transmission of signals from the largest-value detection unit to the signal line 401 and from the smallest-value detection unit to the signal line 402. The period from time t2 to time t3 is an automatic gain control (AGC) period for detecting a peak value and a bottom value of each signal. The AGC period is a transmission period because a peak value and a bottom value are transmitted. The period from time t3 to time t4 is a transmission preparation period for preparing for transmission of signals from the largest-value detection unit to the signal line 401 and from the smallest-value detection unit to the signal line 402. The period from time t4 onward is a transmission period during which pixel signals are transmitted. The transmission period is a period during which signals are read.

First, during the reset period from time t0 to time t1, a signal PRES is at H level, during which the PD 101 and the noninverting input terminal of the operational amplifier 102 are initialized. At that time, the signals POFC in the circuit block 201 and the circuit block 202 are at H level, so that the MOS transistor 230 and the MOS transistor 270 are in a conducting state. The signal PAGC is at L level, so that the MOS transistors 220, 240, 260, and 280 are in a non-conducting state. Furthermore, a signal VBN1 and a signal VBP1 are at bias voltages VBIAS_N and VBIAS_P for operating the differential amplifier circuits 210 and 250, respectively. Here, the circuit blocks 201 and 202 output initialized signals.

During the period from time t1 to time t2, the circuit block 201 and the circuit block 202 maintain the state during the period from time t0 to time t1. Since the signal PAGC is at L level, and the signal POFC is at H level, the MOS transistors 220, 240, 260, and 280 are in a non-conducting state, and the MOS transistors 230 and 270 are in a conducting state. This causes the input/output voltages of the differential amplifier circuit 210 and the differential amplifier circuit 250 to be within an operation range. More accurately, the input/output voltages of the differential amplifier circuit 210 and the differential amplifier circuit 250 are at output voltages from the pixels 100 after completion of the initializing operation.

During the AGC period from time t2 to time t3, the signal PAGC is at H level, and the signal POFC is at L level. Thus, the MOS transistors 220, 240, 260, and 280 are in a conducting state, and the MOS transistors 230 and 270 are in a non-conducting state. When the signal PAGC is at H level, the largest optical output from among the three pixels 100 is output to the signal line 401, and the smallest optical output is output to the signal line 402. In other words, the AGC period is a period during which the largest value and the smallest value are respectively transmitted to the signal lines 401 and 402. This operation uses the characteristics of the NMOS source follower circuit disposed at the output stage of the differential amplifier circuit 210 and the PMOS source follower circuit disposed at the output stage of the differential amplifier circuit 250. During the period in which the signal PAGC is at H level, a signal VBN_AGC is brought to a bias voltage VBIAS_N, and a signal VBP_AGC to a bias voltage VBIAS_P to enable the operations of the current sources 301 and 302. On the other hand, the signal VBN1 is brought to a ground potential (hereinafter referred to as GND), and the signal VBP1 is brought to VDD to disable the MOS transistors 213 and 243, which are current sources. This allows the largest pixel signal to be output to the output POUT through the NMOS source follower circuit, and the smallest pixel signal to be output to the output BOUT through the PMOS source follower circuit. During the AGC period, an AGC operation to control the amplification factors (gains) of signals is performed depending on the difference between the largest value and the smallest value. The difference between the largest value and the smallest value is used for not only gain control in the AGC operation but also control of accumulation time. For example, if the difference becomes a predetermined value or greater, the accumulation of the electrical charges of the pixels is stopped, and a signal reading operation is performed. Accordingly, high-accuracy determination on accumulation is to terminate the AGC period in a short time to determine whether to terminate the accumulation.

In this embodiment, the MOS transistors 230 and 270 are brought to a conducting state to form feedback paths directly before time t2, which is an AGC period start time. In other words, the MOS transistors 230 and 270 are brought to a conducting state before the MOS transistors 220, 240, 260, and 280 are brought to a conducting state. This operation causes the input/output voltages of the differential amplifier circuits 210 and 250 to be equal to the voltage of the output signal of the pixel 100, so that the differential amplifier circuits 210 and 250 operate in a predetermined operation range. This allows the differential amplifier circuits 210 and 250 to start response in the shortest time at time t2.

Thus, forming feedback paths of the differential amplifier circuits 210 and 250 before transmitting signals to the signal lines 401 and 402 and setting terminals of the MOS transistors 220 and 260, that is, the differential amplifier circuits 210 and 250, to desired operating points allow a high-speed reading operation. Furthermore, since the MOS transistor 240 is in a conducting state during the period in which signals are transmitted to the signal line 401, signals in which variations among the MOS transistors 220 are removed can be output from the circuit block 201. Similarly, since the MOS transistor 280 is in a conducting state, signals in which variations among the MOS transistors 260 are removed can be output from the circuit block 202. Such operations allow high-speed signal reading with high-accuracy signal detection.

The NMOS source follower circuit has a high response speed to high voltage, and the PMOS source follower circuit has a high response speed to low voltage. The initial values of the differential amplifier circuits 210 and 250 at time t2 are the values of the pixel signals at time t2. This allows the signal lines 401 and 402 to change toward voltages advantageous for the individual source followers, enabling the largest value and the smallest value to be detected under advantageous conditions in terms of speed.

Subsequently, during the period from time t3 to time t4, the MOS transistors 230 and 270 are brought to conduction to bring the input/output voltages of the differential amplifier circuits 210 and 250 to the output voltages of the pixels 100 as in the period from time t1 to time t2. In other words, the signal PAGC is at L level, and the signal POFC is at H level, so that the MOS transistors 220, 240, 260, and 280 are in a non-conducting state, and the MOS transistors 230 and 270 are in a conducting state.

From time t4 onward, the output signals from the pixels 100 are transmitted from the circuit blocks 202 to the signal line 402 in sequence in response to the signals PH1, PH2, and PH3 coming from the scanning circuit 600. Also during this period, signal can be read in the shortest transmission time as in the above AGC period because the input/output voltages of the circuit blocks 202 are brought to be equal to the outputs of the pixels 100 in advance during the period from time t3 to time t4.

From time t4 onward, the signal PAGC is at L level, and the signal POFC is at H level. This is for the purpose of reading signals from the pixel 100 using a single circuit block 202. If the MOS transistors 260 and the MOS transistors 280 in a plurality of circuit block 202 can be individually controlled, the MOS transistors 280 may be operated. Operating the MOS transistors 280 allows signal in which variations among the MOS transistors 260 are removed to be output from the circuit blocks 202.

Thus, bringing the MOS transistors 230 and 270 in the circuit block 201 and the circuit block 202 into conduction during the transmission preparation period to set the input/output levels of the differential amplifier circuits 210 and 250 to predetermined voltage levels and then shifting to the signal transmission period allow for high-speed signal reading in a short time.

Second Embodiment

Figure 5:
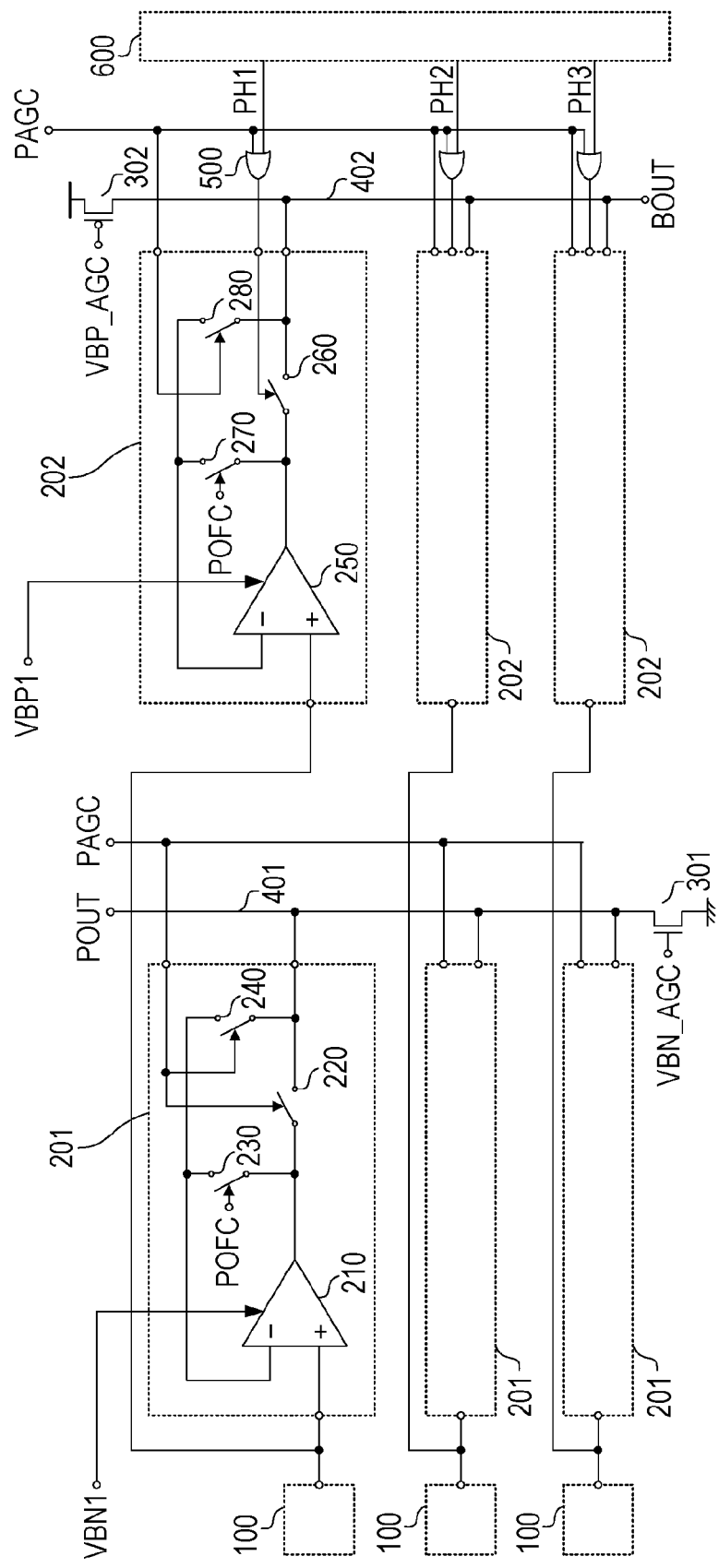
FIG. 5 is a circuit diagram for describing a photoelectric conversion apparatus according to a second embodiment of the present invention.
Figure 6:
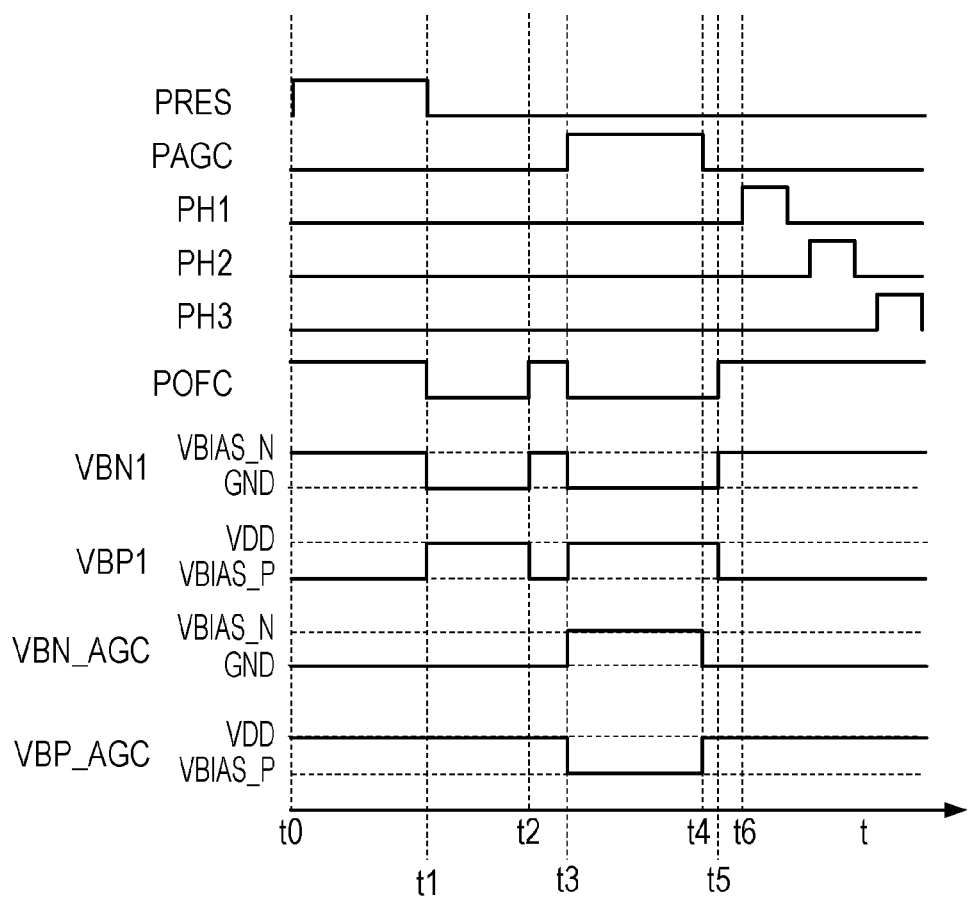
FIG. 6 is a timing chart for describing a method for driving the photoelectric conversion apparatus according to the second embodiment.

A second embodiment of the present invention will be described with reference to FIGS. 5 and 6. FIG. 5 is a circuit diagram of one line sensor unit and corresponds to FIG. 2. FIG. 6 is a timing chart for the circuit in FIG. 5 and corresponds to FIG. 4. The same components as those of the first embodiment are given the same reference signs, and their descriptions will be omitted. Descriptions of the same operations as those of the first embodiment will also be omitted.

In the first embodiment, the MOS transistors 230 and 270 are controlled based on the signal PAGC and the signal POFC thereof. In this embodiment, the MOS transistors 230 and 270 are controlled based on a signal POFC independent of the signal PAGC. This configuration also allows for operation in which signal read time is reduced.

A method of reading of this embodiment will be described with reference to FIG. 6. The period from time t0 to time t1 is a reset period, the period from time t1 to time t3 is a transmission preparation period, and the period from time t3 to time t4 is an AGC period. The period from time t4 to time t6 is a transmission preparation period. The period from time t6 onward is a transmission period during which pixel signals are transmitted. The operations in these periods are basically the same as the operations in the first embodiment, but the second embodiment differs from the first embodiment in that the signal POFC goes to H level in an intermediate point of each of the two transmission preparation periods. Specifically, the signal POFC is at L level during the period from time t1 to time t2 and is at H level during the period from time t2 to time t3. The signal POFC is at L level during the period from time t4 to time t5 and is at H level during the period from time t5 to time t6. In other words, the signal POFC is at H level for at least a fixed period before each transmission period. Such a method of reading also allows for operation in which signal read time is reduced as in the first embodiment. Furthermore, since the MOS transistors 213 and 243, which are current sources, do not operate because the signal VBN1 is at GND, and the VBP1 is at VDD during the period from time t1 to time t2 and the period from time t3 to time t5, the consumption current can be reduced.

The transmission preparation periods may be the shortest required for the differential amplifier circuits 210 and 250 to converge to a desired operating point. The method of reading may be applied to the circuits of the first embodiment.

Third Embodiment

Figure 7:
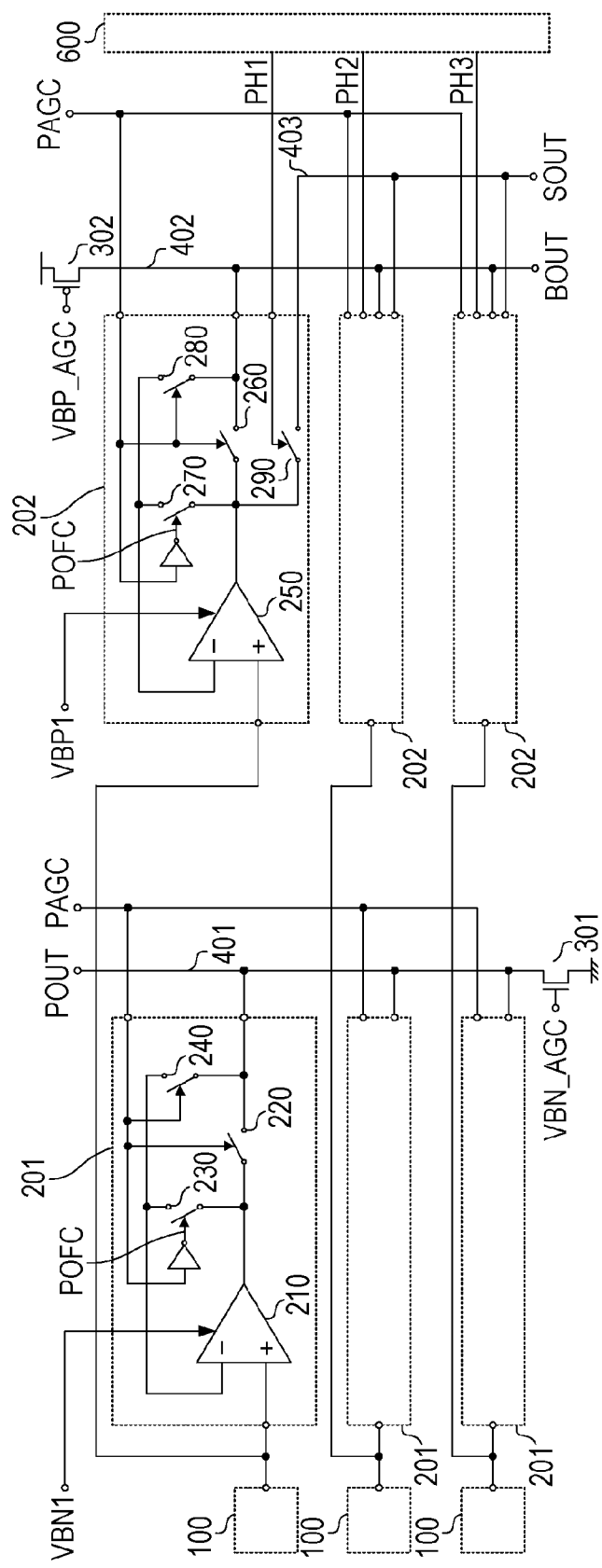
FIG. 7 is a circuit diagram for describing a photoelectric conversion apparatus according to a third embodiment of the present invention.

A third embodiment of the present invention will be described with reference to FIG. 7. FIG. 7 is a circuit diagram of one line sensor unit and corresponds to FIG. 2. The same components as those of the first embodiment are given the same reference signs, and their descriptions will be omitted. Descriptions of the same operations as those of the first embodiment will also be omitted.

In this embodiment, the circuit block 202 is coupled to the signal line 402 and also to a signal line 403. Reading of the smallest value from the circuit block 202 is performed using the signal line 402, and reading of pixel signals is performed using the signal line 403. The signal line 403 is coupled to an output SOUT. The circuit block 202 further includes a MOS transistor 290. A first main electrode of the MOS transistor 290 is coupled to an output terminal of the differential amplifier circuit 250, a first main electrode of the MOS transistor 260, and a first main electrode of the MOS transistor 270. A second main electrode of the MOS transistor 290 is coupled to the signal line 403. In this embodiment, a signal PH1 from the scanning circuit 600 is input to a control electrode of the MOS transistor 290 without passing through an OR circuit. In this manner, pixel signals may be read using only the scanning circuit 600 without the signal PAGC.

The configuration of this embodiment can reduce the circuit area, because there is no need to have an OR circuit.

Fourth Embodiment

Figure 8:
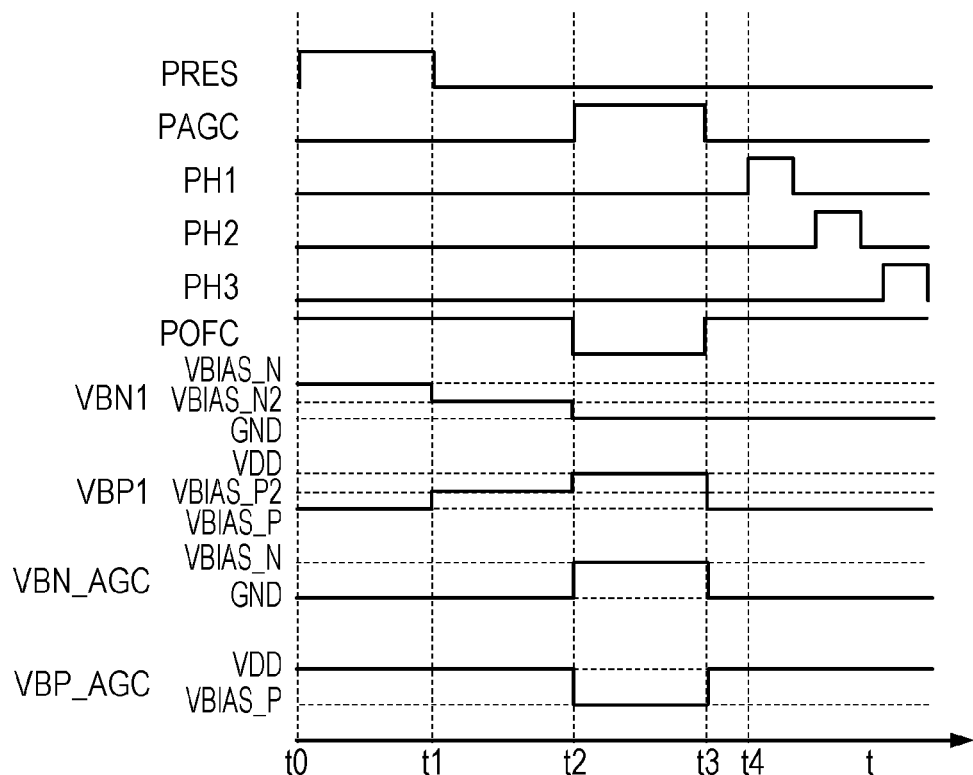
FIG. 8 is a timing chart for describing a method for driving the photoelectric conversion apparatus according to a fourth embodiment of the present invention.

A fourth embodiment of the present invention will be described with reference to FIG. 8. FIG. 8 is a timing chart applicable to the configurations shown in FIG. 2 and other diagrams and corresponds to FIG. 4. The same components as those of the first embodiment are given the same reference signs, and their descriptions will be omitted. Descriptions of the same operations as those of the first embodiment will also be omitted.

In the first embodiment, the current values of the differential amplifier circuits 210 and 250 during the transmission preparation periods and the transmission periods are the same. In other words, the signal VBN1 and the signal VBP1 individually have the same values during the transmission preparation periods (the period from time t1 to time t2 and the period from time t3 to time t4 in FIG. 4) and the transmission periods (from time t2 to time t3 and time t4 onward). In contrast, in this embodiment, the values of the signals VBN1 and VBP1 are changed between the transmission preparation periods and the transmission periods.

Referring to FIG. 8, the signal VBN1 further has a bias voltage VBIAS_N2, and the signal VBP1 further has a bias voltage VBIAS_P2 as compared with FIG. 4. These bias voltages have the relations VBIAS_N>VBIAS_N2>GND and VDD>VBIAS_P2>VBIAS_P. In FIG. 8, during the period from time t1 to time t2, the signal VBN1 is at the bias voltage VBIAS_N2, and the signal VBP1 is at the bias voltage VBIAS_P2. This allows the amounts of current flowing through the current sources 213 and 243 to be smaller than those when the signal VBN1 is at the bias voltage VBIAS_N and when the signal VBP1 is at the bias voltage VBIAS_P. Setting the minimum currents required to operate the differential amplifier circuits 210 and 250 allows for low-power consumption operation with the input/output voltages of the differential amplifier circuits 210 and 250 based on the signals of the pixels 100.

During the period from the time t3 onward, the signal VBN1 is set to the bias voltage VBIAS_N2 or GND. Here, the signal VBN1 is set to GND to reduce the power consumption. The signal VBP1 is set to the bias voltage VBIAS_P or the bias voltage VBIAS_P2 from time t3 onward. Here, the signal VBP1 is set to the bias voltage VBIAS_P from time t3 onward in consideration of the time to stabilize the bias voltages.

Note that there is actually a difference in operating point from the transmission period of the first embodiment due to the driving current, so that the response time can be longer than the response time of the operation of the first embodiment. However, this embodiment also has the same advantageous effects of the present invention as compared with the related art example.

Fifth Embodiment

Figure 9:
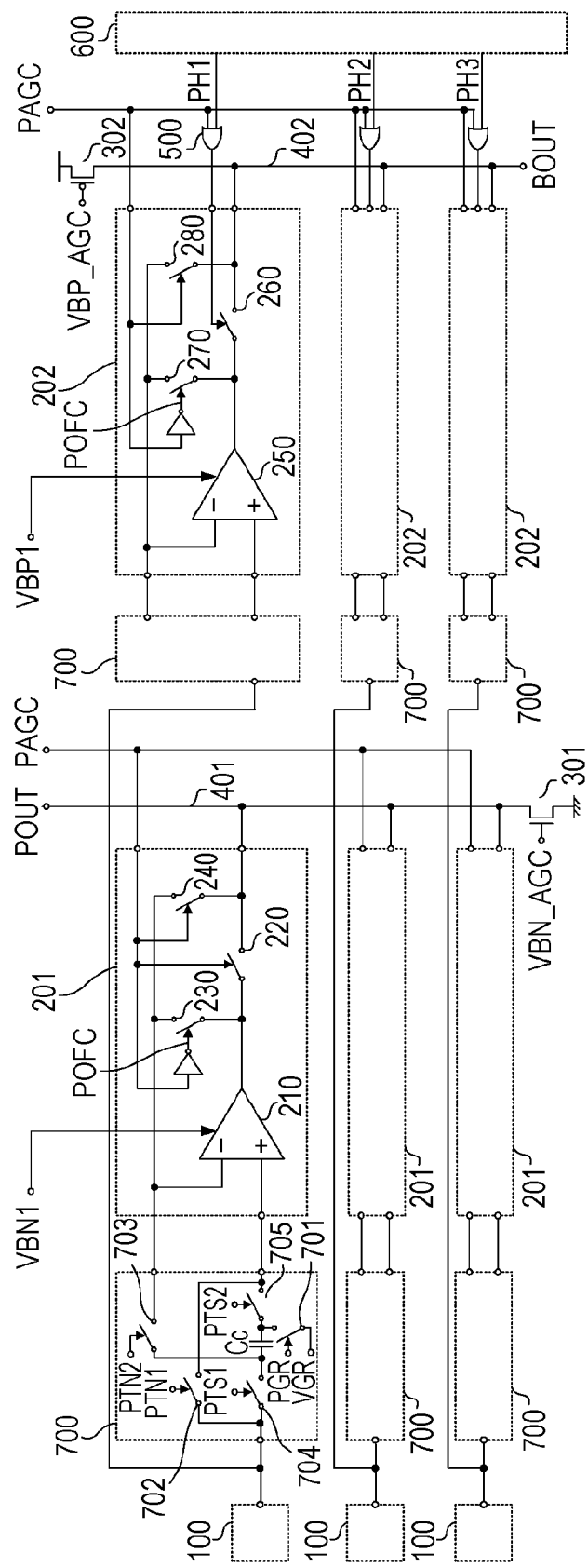
FIG. 9 is a circuit diagram for describing a photoelectric conversion apparatus according to a fifth embodiment of the present invention.
Figure 10:
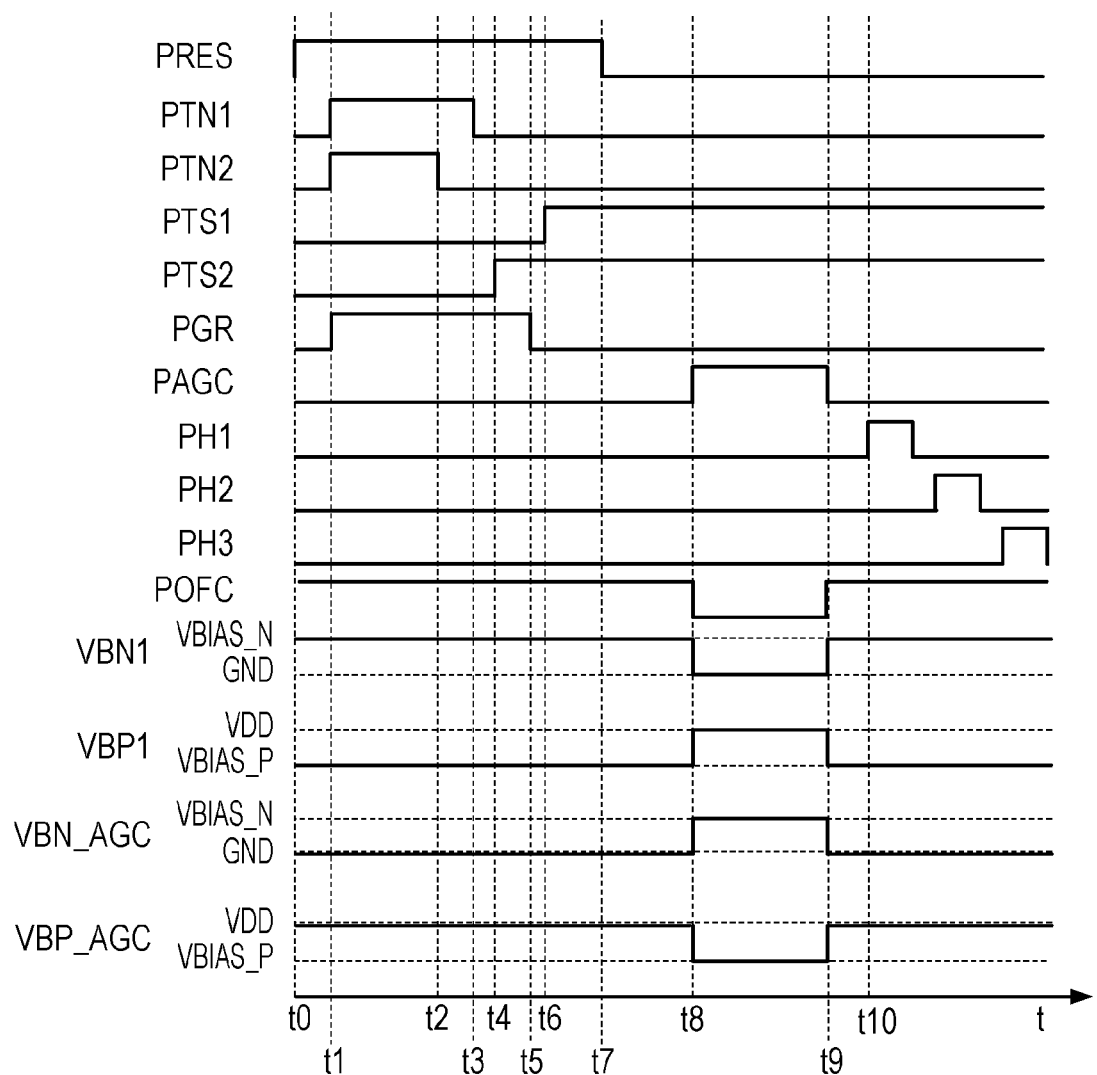
FIG. 10 is a timing chart for describing a method for driving the photoelectric conversion apparatus according to the fifth embodiment.

A fifth embodiment of the present invention will be described with reference to FIGS. 9 and 10. FIG. 9 is a circuit diagram of one line sensor unit and corresponds to FIG. 2. FIG. 10 is a timing chart for the circuit in FIG. 9 and corresponds to FIG. 4. The same components as those of the first embodiment are given the same reference signs, and their descriptions will be omitted. Descriptions of the same operations as those of the first embodiment will also be omitted.

In the first embodiment, reset noise generated when the PD 101 is initialized, offset noise generated in the operational amplifier 102, and offset nose generated in the differential amplifier circuits 210 and 250 are not removed. However, these noises can actually cause errors and erroneous determination in detecting signals. This requires a high-precision photoelectric conversion apparatus in which these noises are reduced. To reduce these noises, this embodiment includes first and second offset canceling units 700 in addition to the configuration shown in FIG. 2. The reset noise of the PD 101, the offset noise of the operational amplifier 102, and the offset noise of the differential amplifier circuits 210 and 250 are hereinafter referred to as noise signals.

Referring to FIG. 9, the first offset canceling unit 700 is disposed between the pixel 100 and the circuit block 201, and the second offset canceling unit 700 is disposed between the pixel 100 and the circuit block 202. The first offset canceling unit 700 is given a signal from the pixel 100, outputs a signal to the circuit block 201, and is given a signal from the circuit block 201. The second offset canceling unit 700 is given a signal from the pixel 100, outputs a signal to the circuit block 202, and is given a signal from the circuit block 202.

The first and second offset canceling units 700 each include MOS transistors 701 to 705 and a capacitor Cc for a clamping circuit. The MOS transistor 701 is controlled by a signal PGR, the MOS transistor 702 is controlled by a signal PTN1, the MOS transistor 703 is controlled by a signal PTN2, the MOS transistor 704 is controlled by a signal PTS1, and the MOS transistor 705 is controlled by a signal PTS2.

In FIG. 9, the MOS transistors 701 to 705 and the capacitor Cc of each offset canceling unit 700 are coupled as follows. A first main electrode of the MOS transistor 702 and a first main electrode of the MOS transistor 704 are coupled together, to which signals from the pixel 100 are input. A second main electrode of the MOS transistor 704 is coupled to a first main electrode of the MOS transistor 703 and a first electrode of the capacitor Cc. A second electrode of the capacitor Cc is coupled to a first main electrode of the MOS transistor 701 and a first main electrode of the MOS transistor 705. A second main electrode of the MOS transistor 701 is coupled to a power source voltage VGR. For the first offset canceling unit 700 coupled to the circuit block 201, a second main electrode of the MOS transistor 703 is coupled to an inverting input terminal of the differential amplifier circuit 210. A second main electrode of the MOS transistor 705 is coupled to a second main electrode of the MOS transistor 702 and the noninverting input terminal of the differential amplifier circuit 210. For the second offset canceling unit 700 coupled to the circuit block 202, the second main electrode of the MOS transistor 703 is coupled to an inverting input terminal of the differential amplifier circuit 250. The second main electrode of the MOS transistor 705 is coupled to the second main electrode of the MOS transistor 702 and the noninverting input terminal of the differential amplifier circuit 250.

Figure 11:
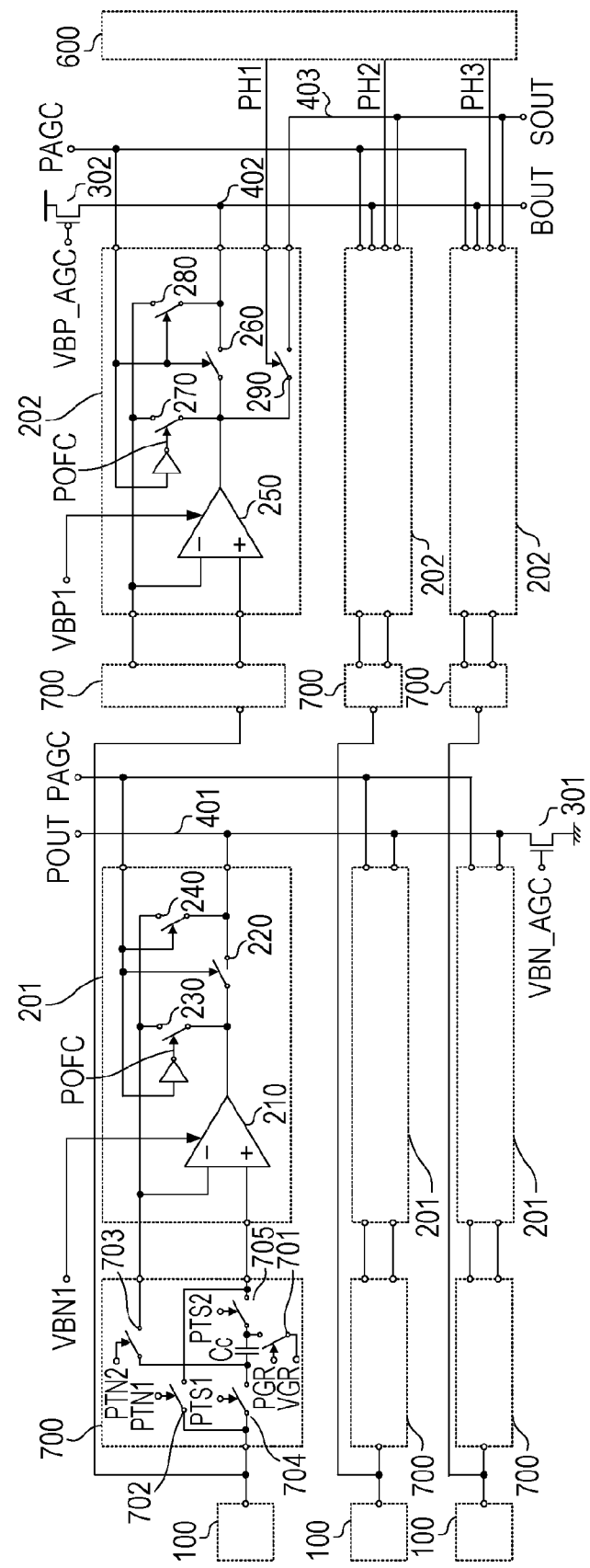
FIG. 11 is a circuit diagram for describing a photoelectric conversion apparatus according to a sixth embodiment of the present invention.

The operation of the thus-configured photoelectric conversion apparatus will be described with reference to FIG. 11.

AT time t0, the signal PRES goes to H level, at which the operation of initializing the PD 101 and the noninverting input terminal of the operational amplifier 102 is started. Here, the circuit blocks 201 and 202 output an initialized signal.

At time t1, the signal PGR, the signal PTN1, and the signal PTN2 rise to H level, so that the MOS transistors 701 to 703 are brought into conduction. This allows a reset signal containing reset noise directly after the pixel 100 is initialized and offset noise in the differential amplifier circuit 210 or the differential amplifier circuit 250 to be sampled in the capacitor Cc with reference to the power source voltage VGR. At time t2, the signal PTN2 goes to L level, so that the MOS transistor 703 is brought to a non-conducting state. At time t3, the signal PTN1 goes to L level, so that the MOS transistor 702 is brought to a non-conducting state. Thereafter, at time t4, the signal PTS2 is brought to H level to bring the MOS transistor 705 into conduction. This causes the potentials of the noninverting input terminal of the differential amplifier circuit 210 or the noninverting input terminal of the differential amplifier circuit 250 and the second electrode of the capacitor Cc coupled thereto to be the voltage VGR. When the signal PGR goes to L level at time t5, the noninverting input terminal of the differential amplifier circuit 210 or the noninverting input terminal of the differential amplifier circuit 250 and the second electrode of the capacitor Cc go to a floating state. At that time, the reset signal is held between the electrodes of the capacitor Cc with reference to the power source voltage VGR.

When the signal PTS1 goes to H level, so that the pixel 100 is coupled to the first electrode of the capacitor Cc at time t6, monitoring of the output of the pixel 100 (AGC operation) is started.

The operations after the signal PRES goes to L level at time t7 are the same as those of the first embodiment. However, the offset noise of the operational amplifier 102 and the differential amplifier circuits 210 and 250 is held (clamped) in the capacitor Cc during that time. This causes the signal levels of the differential amplifier circuits 210 and 250 based on the output of the pixel 100 to be at a voltage value in which the noise signal is reduced by the operation of the clamping circuit.

Thus, the solid-state image capturing apparatus of this embodiment has the advantage of reducing the influence of the noise signal, in addition to the advantageous effects described in the first embodiment.

Sixth Embodiment

A sixth embodiment of the present invention will be described with reference to FIG. 11. FIG. 11 is a circuit diagram of one line sensor unit and corresponds to FIG. 2. In FIG. 11, the same components as those of the first embodiment are given the same reference signs, and their descriptions will be omitted. Descriptions of the same operations as those of the first embodiment will also be omitted.

This embodiment has the configuration of the third embodiment in FIG. 7 and the configuration of the fifth embodiment in FIG. 9 as compared with the configuration of the first embodiment in FIG. 2. In other words, the photoelectric conversion apparatus of this embodiment is configured such that the circuit block 202 is coupled to the signal line 403 in addition to the signal line 402, and the photoelectric conversion apparatus includes the offset canceling units 700 between the pixel 100 and the circuit block 201 and between the pixel 100 and the circuit block 202. Such a configuration allows noise signals to be reduced while achieving high-speed signal reading.

Seventh Embodiment

Figure 12:
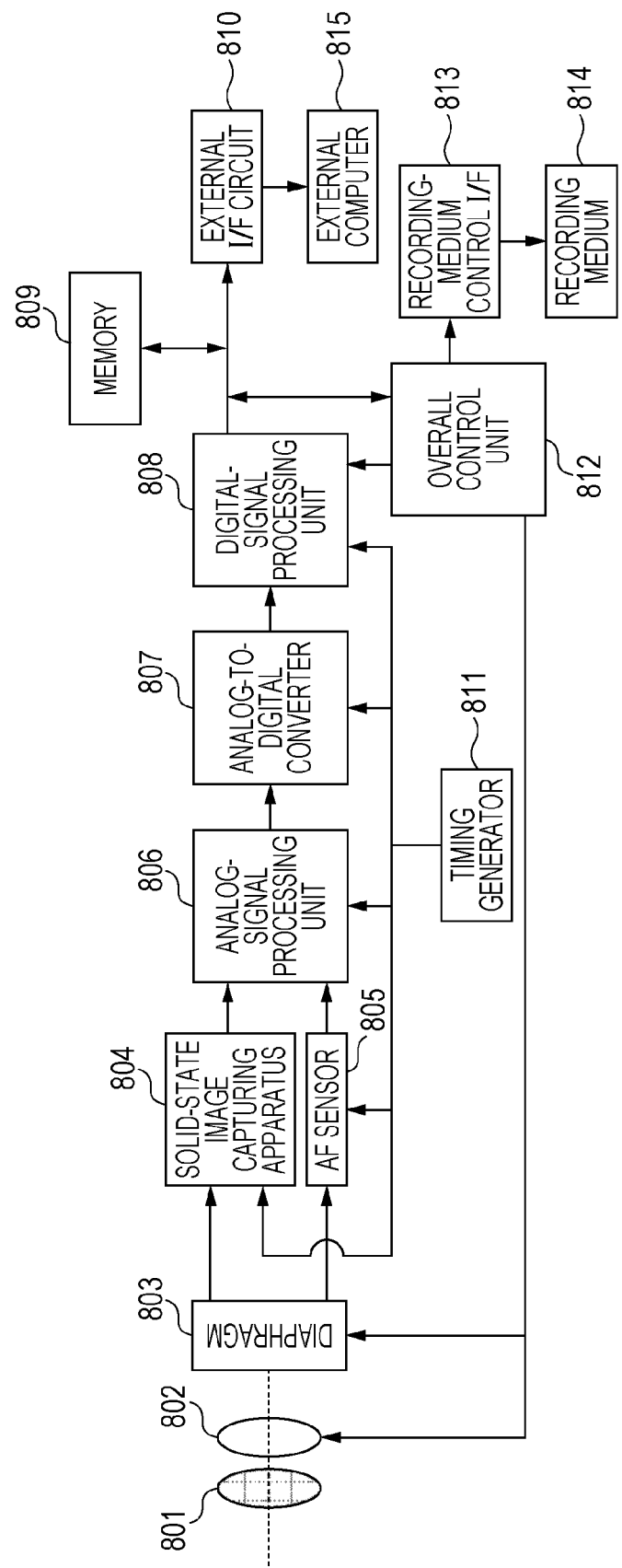
FIG. 12 is a block diagram illustrating an image capturing system according to a seventh embodiment of the present invention.

An image capturing system according to a seventh embodiment will be described with reference to FIG. 12. FIG. 12 is a block diagram showing a configuration example of the image capturing system.

A barrier 801 is used to protect a lens 802. The lens 802 is used to form an optical image of an object on a solid-state image capturing apparatus 804. A diaphragm 803 is used to adjust the amount of light that has passed through the lens 802. The solid-state image capturing apparatus 804 is used to acquire the optical image of the object formed with the lens 802 in the form of an image signal. An AF sensor 805 is a sensor including one of the photoelectric conversion apparatuses according to the above embodiments.

An analog-signal processing unit 806 is used to process signals output from the solid-state image capturing apparatus 804 and the AF sensor 805. An analog-to-digital converter 807 is used to convert an analog signal output from the analog-signal processing unit 806 to a digital signal. A digital-signal processing unit 808 is used to perform various corrections and compression on image data output from the analog-to-digital converter 807.

A memory 809 is used to temporarily store image data. An external interface (hereinafter abbreviated as I/F) circuit 810 is used to communicate with an external computer or any other device. A timing generator 811 is used to output various timing signals to the digital-signal processing unit 808 and any other units. An overall control unit 812 is used to control various calculations and the whole of the camera. Reference sign 813 denotes a recording-medium control I/F 813. A recording medium 814 is a detachable recording medium, such as a semiconductor memory, to/from which acquired image data is recorded or read. Reference sign 815 denotes an external computer. A focus detection apparatus may include the lens 802, the timing generator 811, and the overall control unit 812 in addition to the AF sensor 805. The overall control unit 812 of the focus detection apparatus also serves as a signal processing unit that detects a focus using a signal output from the AF sensor 805.

Next, the image capturing operation of the image capturing system will be described. When the barrier 801 is opened, the overall control unit 812 calculates a distance to the object based on a signal output from the AF sensor 805 using the phase difference detection described above. Thereafter, the overall control unit 812 drives the lens 802 based on the calculation result and determines again whether focus is achieved. If it is determined that focus is not achieved, the overall control unit 812 performs autofocusing control to drive the lens 802 again. Next, after it is determined that focus is achieved, an accumulating operation of the solid-state image capturing apparatus 804 is started. After completion of the accumulating operation of the solid-state image capturing apparatus 804, the image signal output from the solid-state image capturing apparatus 804 is converted from analog to digital by the analog-to-digital converter 807. The digital signal passes through the digital-signal processing unit 808 and is written to the memory 809 under the control of the overall control unit 812. Thereafter, the data accumulated in the memory 809 is recorded in the recording medium 814 via the recording-medium control I/F 810 under the control of the overall control unit 812. Alternatively, the data may be directly input to the external computer 815 or any other device via the external I/F 810.

It is to be understood that the embodiments described above are given for mere illustration and that various modifications and combinations can be made without departing the technical spirit of the present invention. For example, although the circuit block 201 and the circuit block 202 have the same configuration to enhance the symmetry of the signal paths, the circuit blocks 201 and 202 may have different configurations. Furthermore, pixel signals may be output from the circuit block 201. The conductivity types of the signals and the MOS transistors may be opposite conductivity types. Furthermore, although the above embodiments use the MOS transistors as switches, other devices may be used.

The photoelectric conversion apparatus and the method for driving the photoelectric conversion apparatus according to some embodiments of the present invention allow for high-speed signal reading with high signal detection accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-244335, filed Dec. 2, 2014, which is hereby incorporated by reference herein in its entirety.

What is claimed is:

1. A photoelectric conversion apparatus comprising:
   a photoelectric conversion unit;
   a signal line
   a circuit block coupled between the photoelectric conversion unit and the signal line; and
   a control circuit configured to control the circuit block,
   wherein the circuit block includes:
      a differential amplifier circuit including:
         a noninverting input terminal to which a signal from the photoelectric conversion unit is input;
         an inverting input terminal;
         an output terminal; and
         a feedback path coupling the inverting input terminal and the output terminal together;
      a first switch including:
         a first terminal coupling to the output terminal; and
         a second terminal coupling to the signal line, the first switch being configured to control conduction between the output terminal and the signal line;
      a second switch including:
         a first terminal coupling to the inverting input terminal; and
         a second terminal coupling to the signal line and the second terminal of the first switch, the second switch being configured to control conduction between the inverting input terminal and the signal line; and
      a third switch including:
         a first terminal coupling to the inverting input terminal; and
         a second terminal coupling to the output terminal and the first terminal of the first switch, the third switch being configured to control conduction between the inverting input terminal and the output terminal,
   wherein the control circuit supplies a first signal for controlling the first switch and the second switch and a second signal for controlling the third switch, and
   wherein the first signal and the second signal are in relation of logical NOT.

2. The photoelectric conversion apparatus according to claim 1,
   wherein the control circuit brings the first switch and the second switch into a conducting state and brings the third switch into a non-conducting state during a period in which a signal is read from the circuit block, and
   wherein the control circuit brings the third switch into a conducting state before the period in which the signal is read.

3. The photoelectric conversion apparatus according to claim 1, further comprising a first current source coupled to the signal line,
   wherein the differential amplifier circuit includes a second current source and a transistor that constitutes a source follower circuit together with the first current source or the second current source.

4. The photoelectric conversion apparatus according to claim 3,
   wherein the first current source operates at a first current value during a period in which the first switch is to be in a conducting state, and
   wherein the second current source operates at a second current value larger than the first current value during a period in which the third switch is to be in a conducting state.

5. The photoelectric conversion apparatus according to claim 1, wherein a plurality of sets of the photoelectric conversion unit and the circuit block are coupled to the signal line.

6. The photoelectric conversion apparatus according to claim 1, further comprising an offset canceling unit configured to reduce offset generated in the circuit block.

7. The photoelectric conversion apparatus according to claim 6, wherein the signal output from the photoelectric conversion unit is input to the circuit block via the offset canceling unit.

8. The photoelectric conversion apparatus according to claim 6, wherein the offset canceling unit includes a clamping circuit.

9. The photoelectric conversion apparatus according to claim 1, further comprising:
   a second signal line; and
   a second circuit block coupled between the photoelectric conversion unit and the second signal line,
   wherein the second circuit block includes:
      a second differential amplifier circuit including:
         a second noninverting input terminal to which the signal output from the photoelectric conversion unit is input;
         a second inverting input terminal;
         a second output terminal; and a second feedback path coupling the second inverting input terminal and the second output terminal together;
a fourth switch including:
a first terminal coupling to the second output terminal; and
a second terminal coupling to the second signal line, the fourth switch being configured to control a conducting state between the output terminal and the second signal line;
a fifth switch including:
a first terminal coupling to the second inverting input terminal; and
a second terminal coupling to the second signal line and the second terminal of the fourth switch, the fifth switch being configured to control a conducting state between the second inverting input terminal and the second signal line; and
a sixth switch including:
a first terminal coupling to the second inverting input terminal; and
a second terminal coupling to the second output terminal and the first terminal of the fourth switch, the sixth switch being configured to control a conducting state between the second inverting input terminal and the second output terminal,
wherein the control circuit controls operation of the second circuit block and brings the sixth switch to a conducting state before bringing the fourth switch and the fifth switch to a conducting state to output a signal from the second circuit block.

10. The photoelectric conversion apparatus according to claim 9, wherein a second plurality of sets of the photoelectric conversion unit and the second circuit block are coupled to the second signal line.

11. The photoelectric conversion apparatus according to claim 9, further comprising a second offset canceling unit configured to reduce offset generated in the second circuit block.

12. The photoelectric conversion apparatus according to claim 11, wherein the signal output from the photoelectric conversion unit is input to the second circuit block via the second offset canceling unit.

13. The photoelectric conversion apparatus according to claim 11, wherein the second offset canceling unit includes a clamping circuit.

14. A focus detection apparatus comprising:
a photoelectric conversion apparatus; and
a signal processing unit configured to detect a focus based on a signal output from the photoelectric conversion apparatus,
wherein the photoelectric conversion apparatus includes:
a photoelectric conversion unit;
a signal line;
a circuit block coupled between the photoelectric conversion unit and the signal line; and
a control circuit configured to control the circuit block,
wherein the circuit block includes:
a differential amplifier circuit including:
a noninverting input terminal to which a signal from the photoelectric conversion unit is input;
an inverting input terminal;
an output terminal; and
a feedback path coupling the inverting input terminal and the output terminal together;
a first switch including:
a first terminal coupling to the output terminal; and
a second terminal coupling to the signal line, the first switch being configured to control conduction between the output terminal and the signal line;
a second switch including:
a first terminal coupling to the inverting input terminal; and
a second terminal coupling to the signal line and the second terminal of the first switch, the second switch being configured to control conduction between the inverting input terminal and the signal line; and
a third switch including:
a first terminal coupling to the inverting input terminal; and
a second terminal coupling to the output terminal and the first terminal of the first switch, the third switch being configured to control conduction between the inverting input terminal and the output terminal,
wherein the control circuit supplies a first signal for controlling the first switch and the second switch and a second signal for controlling the third switch, and
wherein the first signal and the second signal are in relation of logical NOT.

15. An image capturing system comprising:
a focus detection apparatus;
a solid-state image capturing apparatus;
a lens that guides light to the solid-state image capturing apparatus and the focus detection apparatus; and
an overall control unit,
wherein the overall control unit drives the lens based on output of the focus detection apparatus,
wherein the focus detection apparatus includes a photoelectric conversion apparatus,
the photoelectric conversion apparatus including:
a photoelectric conversion unit;
a signal line;
a circuit block coupled between the photoelectric conversion unit and the signal line; and
a control circuit configured to control the circuit block,
wherein the circuit block includes:
a differential amplifier circuit including:
a noninverting input terminal to which a signal from the photoelectric conversion unit is input;
an inverting input terminal;
an output terminal; and
a feedback path coupling the inverting input terminal and the output terminal together;
a first switch including:
a first terminal coupling to the output terminal; and
a second terminal coupling to the signal line, the first switch being configured to control conduction between the output terminal and the signal line;
a second switch including:
a first terminal coupling to the inverting input terminal; and
a second terminal coupling to the signal line and the second terminal of the first switch, the second switch being configured to control conduction between the inverting input terminal and the signal line; and
a third switch including:
a first terminal coupling to the inverting input terminal; and a second terminal coupling to the output terminal and the first terminal of the first switch, the third switch being configured to control conduction between the inverting input terminal and the output terminal,
wherein the control circuit supplies a first signal for controlling the first switch and the second switch and a second signal for controlling the third switch, and
wherein the first signal and the second signal are in relation of logical NOT.

16. The image capturing system according to claim 15, wherein the control circuit brings the first switch and the second switch into a conducting state and brings the third switch into a non-conducting state during a period in which a signal is read from the circuit block, and
wherein the control circuit brings the third switch into a conducting state before the period in which the signal is read.

17. The image capturing system according to claim 15, wherein the photoelectric conversion apparatus further comprises a first current source coupled to the signal line,
wherein the differential amplifier circuit includes a second current source and a transistor that constitutes a source follower circuit together with the first current source or the second current source.

18. The image capturing system according to claim 15, wherein a plurality of sets of the photoelectric conversion unit and the circuit block are coupled to the signal line.

19. The image capturing system according to claim 15, wherein the photoelectric conversion apparatus further comprises an offset canceling unit configured to reduce offset generated in the circuit block.

20. The image capturing system according to claim 15, wherein the photoelectric conversion apparatus further comprises:
a second circuit block coupled between the photoelectric conversion unit and a second signal line,
wherein the second circuit block includes:
a second differential amplifier circuit including:
a second noninverting input terminal to which the signal output from the photoelectric conversion unit is input;
a second inverting input terminal;
a second output terminal; and
a second feedback path coupling the second inverting input terminal and the second output terminal together;
a fourth switch including:
a first terminal coupling to the second output terminal; and
a second terminal coupling to the second signal line, the fourth switch being configured to control a conducting state between the output terminal and the second signal line;
a fifth switch including:
a first terminal coupling to the second inverting input terminal; and
a second terminal coupling to the second signal line and the second terminal of the fourth switch, the fifth switch being configured to control a conducting state between the second inverting input terminal and the second signal line; and
a sixth switch including:
a first terminal coupling to the second inverting input terminal; and
a second terminal coupling to the second output terminal and the first terminal of the fourth switch, the sixth switch being configured to control a conducting state between the second inverting input terminal and the second output terminal,
wherein the control circuit controls operation of the second circuit block and brings the sixth switch to a conducting state before bringing the fourth switch and the fifth switch to a conducting state to output a signal from the second circuit block.

* * * * *